(12) United States Patent
Tsujimura et al.

(10) Patent No.: US 7,243,532 B2
(45) Date of Patent: Jul. 17, 2007

(54) MISFIRE DETECTOR FOR INTERNAL COMBUSTION ENGINES

(75) Inventors: Tomohiro Tsujimura, Kariya (JP); Noriaki Ikemoto, Obu (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/001,647

(22) Filed: Dec. 2, 2004

(65) Prior Publication Data
US 2005/0120786 A1 Jun. 9, 2005

(30) Foreign Application Priority Data
Dec. 4, 2003 (JP) ............... 2003-405573

(51) Int. Cl.
*G01M 15/00* (2006.01)
(52) U.S. Cl. ............ 73/117.2; 73/116; 73/117.3; 73/118.1; 73/119 R
(58) Field of Classification Search ......... 73/117.2, 73/117.3
See application file for complete search history.

(56) References Cited

U.S. PATENT DOCUMENTS

| | | | | |
|---|---|---|---|---|
| 4,445,326 A | * | 5/1984 | Lyon ............... | 60/277 |
| 5,524,598 A | * | 6/1996 | Hasegawa et al. ...... | 123/672 |
| 5,542,404 A | | 8/1996 | Hasegawa et al. ...... | 123/690 |
| 5,700,954 A | * | 12/1997 | Sinha et al. ........ | 73/116 |
| 5,730,111 A | | 3/1998 | Kaji et al. | |
| 5,806,012 A | | 9/1998 | Maki et al. | |
| 5,908,463 A | | 6/1999 | Akazaki et al. | |
| 6,230,095 B1 | * | 5/2001 | Wang ............... | 701/110 |
| 2005/0022797 A1 | | 2/2005 | Ikemoto et al. | |

FOREIGN PATENT DOCUMENTS

| | | |
|---|---|---|
| JP | B2-3-37020 | 4/1991 |
| JP | 6-45644 | 11/1994 |
| JP | 7-34946 | 2/1995 |
| JP | 7-317586 | 12/1995 |
| JP | A-8-338285 | 12/1996 |

OTHER PUBLICATIONS

U.S. Appl. No. 10/901,087, filed Jul. 2004, Ikemoto et al.

* cited by examiner

*Primary Examiner*—Edward Lefkowitz
*Assistant Examiner*—Freddie Kirkland, III
(74) *Attorney, Agent, or Firm*—Nixon & Vanderhye P.C.

(57) ABSTRACT

Air fuel ratios of exhaust gases of respective cylinders are estimated based on a detection value of an air fuel ratio sensor mounted in an exhaust-collector. Normal combustion and misfire are determined depending upon whether individual cylinder air fuel ratios of the respective cylinders are within a normal combustion range. Then, whether a fuel system causes misfire is determined based on a difference between an actual injection quantity of the misfire cylinder and an average value of actual injection quantities of all the cylinders. Whether an air system causes misfire is determined based on a difference between an estimated air quantity of the misfire cylinder and an average value of actual air quantities of all the cylinders.

6 Claims, 11 Drawing Sheets

MISFIRE DETECTOR FOR INTERNAL COMBUSTION ENGINES

CROSS-REFERENCE TO RELATED APPLICATION

This application is based on Japanese Patent Application No. 2003-405573 filed on Dec. 4, 2003, the disclosure of which is incorporated herein by reference.

FIELD OF THE INVENTION

The present invention relates to a misfire detection apparatus for internal combustion engines, which detects misfire of an individual cylinder of an internal combustion engine and determines the cause of misfire.

BACKGROUND OF THE INVENTION

When misfire is generated while an internal combustion engine is running, an engine rotating speed decreases momentarily. Misfire detection apparatuses detect variation in rotation every explosion stroke of respective cylinders to compare the variation in rotation with a predetermined misfire determination value to determine presence and absence of misfire, as described in JP-7-317586 A.

In some cases, however, a detected value of variation in rotation varies widely even at the time of normal combustion due to dispersion in combustion among cylinders, traveling on rough road, or the like. Alternatively, the detected value of variation in rotation varies widely due to fabrication tolerance in crank angle sensors, which detect an engine rotating speed. Furthermore, there is a situation, in which variation in rotation due to misfire decreases in a region of high rotation, so that these are responsible for degradation in accuracy for detection of misfire.

Also, with the misfire detection apparatus, a target air fuel ratio is corrected toward a rich side for that cylinder, in which misfire is detected, to suppress misfire. And failure in a fuel system or an ignition system is determined in the case where the misfire cylinder is not returned to normal combustion even when correction of a target air fuel ratio toward the rich side is successively repeated predetermined times.

With such construction, however, even when misfire is generated due to failure in an air system, there is caused a problem that failure in the fuel system or the ignition system is erroneously determined. A failure in the fuel system or the ignition system is not determined until correction of the target air fuel ratio toward the rich side is successively repeated predetermined times for the misfire cylinder. Thus, there is a disadvantage that unburned gas subjected to rich correction is discharged from the misfire cylinder until failure is determined and there is caused an increase in HC discharge.

Further, known documents, in which abnormality diagnosis techniques for internal combustion engines are described, include, for example, JP-7-34946 A, in which a technique for diagnosis of abnormality in a fuel system based on a fuel correction quantity by cylinder is described.

Since such abnormality diagnosis technique cannot detect abnormality in an air system, there is involved a problem that abnormality in the air system is erroneously determined to be abnormality in a fuel system. For example, in the case where an intake air quantity increases extraordinarily due to some reason when the fuel system is normal, a fuel increase-correction amount increases extraordinarily so as to maintain a target air fuel ratio, so that there is caused a problem that abnormality in the fuel system is erroneously determined. Besides, it is not possible to detect misfire from a fuel correction quantity by cylinder.

As described above, the prior art involves a problem that accuracy in detection of misfire is low, there is the possibility that the cause for misfire is erroneously determined, and the like.

SUMMARY OF THE INVENTION

The invention has been thought of in view of such situation, and accordingly has its object to provide a misfire detection apparatus for internal combustion engines, capable of enhancing accuracy in detection of misfire and accuracy in determination of a cause for misfire.

In order to attain the object, the invention pays attention to a behavior of an air fuel ratio that unburned gas is discharged from that cylinder, in which misfire is generated, and an air fuel ratio of exhaust gases rapidly changes, uses an individual cylinder air fuel ratio information acquisition means to acquire air fuel ratios of exhaust gases in each cylinder, or parameters variable according thereto (referred below to as "individual cylinder air fuel ratio information"), uses misfire detection means to detect misfire by cylinder based on the individual cylinder air fuel ratio information, and uses misfire cause determination means to determine a cause for misfire for that cylinder, in which misfire is detected, based on at least one of a fuel injection quantity, an intake air quantity, and ignition timing. The individual cylinder air fuel ratio information of the misfire cylinder rapidly changes at the time of generation of misfire. The misfire individual cylinder can be accurately detected by monitoring the behavior of individual cylinder air fuel ratio information of respective cylinders, without being much affected by dispersion in combustion among the cylinders, variation in rotation due to traveling on rough road, and a region of rotation. Besides, it is possible to determine a cause for misfire for that cylinder, in which misfire is detected, based on at least one of a fuel injection quantity, an intake air quantity, and ignition timing.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENTS

Figure 1:
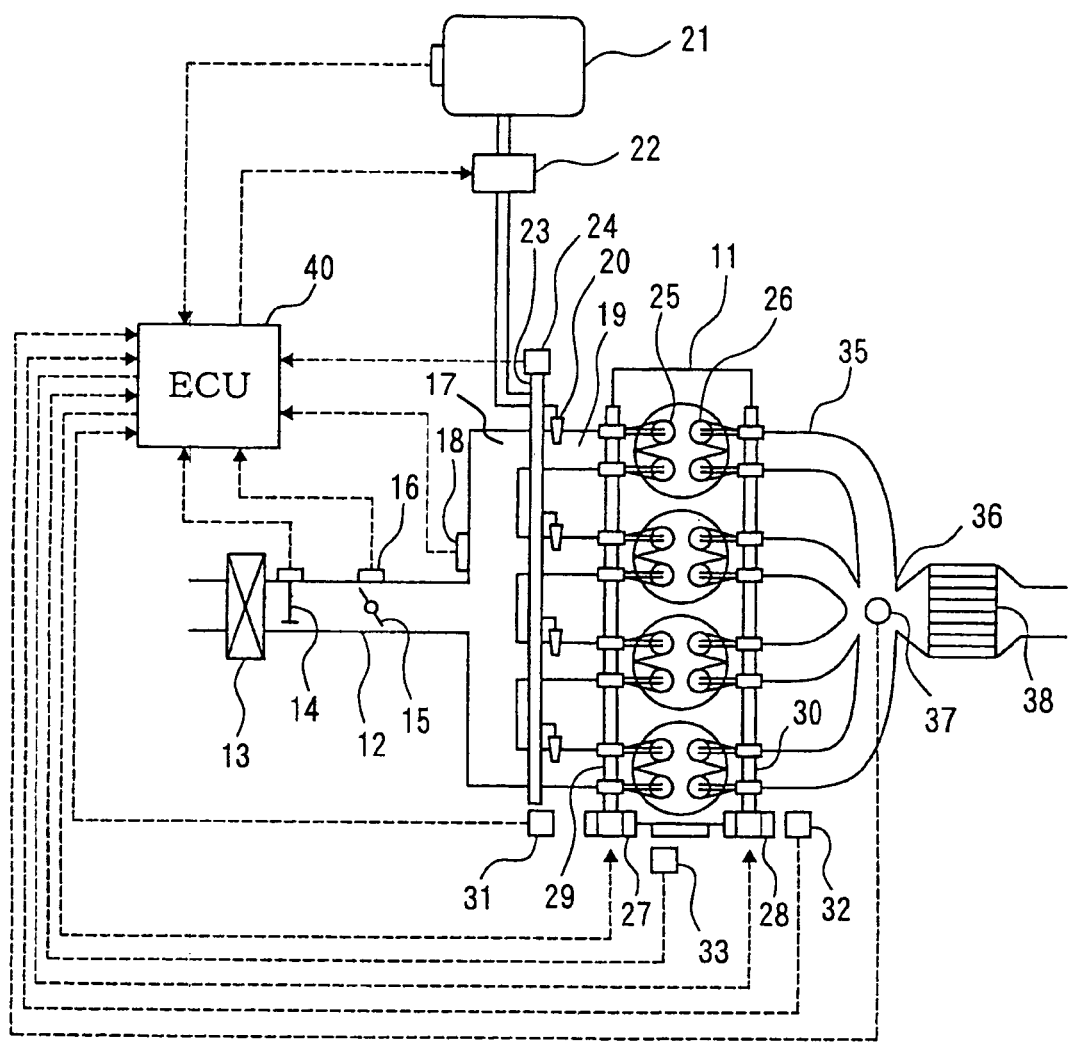
FIG. 1 is a view showing a schematic configuration of an engine control system according to an embodiment of the invention.

An embodiment of an intake port injection engine, to which the invention is applied, will be described below with reference to the drawings. First, a schematic configuration of a whole engine control system will be described with reference to FIG. 1. An air cleaner 13 is provided on a most upstream portion of an intake pipe 12 of, for example, an in-line four-cylinder engine 11, and an air flow meter 14 for detection of an intake air quantity is provided on a downstream side of the air cleaner 13. Provided on a downstream side of the air flow meter 14 are a throttle valve 15, of which an opening degree is adjusted by a motor or the like, and a throttle opening degree sensor 16 for detection of a throttle opening degree.

Further, a surge tank 17 is provided on a downstream side of the throttle valve 15, and an intake-pipe pressure sensor 18 for detection of an intake-pipe pressure is provided on the surge tank 17. In addition, an intake manifold 19 for introduction of an into respective cylinders of the engine 11 is provided on the surge tank 17, and fuel injection valves 20 for injection of a fuel are mounted in the vicinity of respective intake ports of the intake manifold 19 for the respective cylinders. In the operation of the engine, a fuel in a fuel tank 21 is fed to a delivery pipe 23 by a fuel pump 22, and the fuel is injected every injection timing of the respective cylinders from the fuel injection valves 20 of the respective cylinders. A fuel pressure sensor 24 for detection of fuel pressure is mounted to the delivery pipe 23.

In addition, variable valve timing mechanisms 27, 28 are provided on the engine 11 to vary opening and closing timing of intake valves 25 and exhaust valves 26, respectively. Further, an intake cam angle sensor 31 and an exhaust cam angle sensor 32 are provided on the engine 11 to output cam angle signals in synchronism with rotation of an intake camshaft 29 and an exhaust camshaft 30. A crank angle sensor 33 is provided on the engine 11 to output a crank angle signal in synchronism with rotation of a crankshaft of the engine 11.

On the other hand, an air fuel ratio sensor 37 for detection of an air fuel ratio of exhaust gases is mounted in an exhaust-collector 36, in which exhaust manifolds 35 of the respective cylinders of the engine 11 collect. A catalyst 38 such as ternary catalyst or the like is provided downstream of the air fuel ratio sensor 37 to purify CO, HC, NOx, etc. in exhaust gases.

Outputs of the respective sensors such as the air fuel ratio sensor 37 and the like are input into an electrical control circuit (referred below to as "ECU") 40. The ECU 40 is mainly composed of a microcomputer to execute various engine control programs stored in a built-in ROM (storage medium), thus controlling fuel injection quantities (injection pulse width) and ignition timing of the fuel injection valves 20 of the respective cylinders according to the engine operating state.

According to the embodiment, the ECU 40 corrects air fuel ratios of mixtures supplied to the respective cylinders, by using an individual cylinder air fuel ratio estimation model, described later, to estimate an individual air fuel ratios of exhaust gases (referred below to as "individual cylinder air fuel ratio") based on a detection value of the air fuel ratio sensor 37, calculating correction quantities of air fuel ratios by cylinder in a manner to decrease dispersion in the individual cylinder air fuel ratios (dispersion in air fuel ratio among cylinders), and correcting fuel injection quantities (and/or intake air quantities) of the respective cylinders based on the correction quantities of air fuel ratios by cylinder. The function of the ECU 40 corresponds to individual cylinder air fuel ratio correction means.

Further, the ECU 40 executes respective routines described later and shown in FIGS. 2 to 7 to make a comparison between individual cylinder air fuel ratios estimated based on a detection value of the air fuel ratio sensor 37 and determination values C1, C2 to detect misfire by cylinder, and to determine which of a fuel system, an air system, and an ignition system causes misfire, based on fuel injection quantity, intake air quantity, and ignition timing for that cylinder, of which misfire is detected, thus identifying the cause for misfire. Here, the fuel system comprises a system (the fuel injection valves 20, the fuel pump 22, the fuel pressure sensor 24, etc.) to control fuel injection quantities of the respective cylinders, the air system comprises a system (an electronic throttle system for electric controlling of an opening degree of the throttle valve 15, the variable valve timing mechanisms 27, 28, etc.) to control air quantities of the respective cylinders, and the ignition system comprises a system to control ignition timing.

In this case, the ECU 40 executes the misfire restoration control by discriminatingly detecting misfire caused by excessive rich (referred below to as "rich misfire") and misfire caused by excessive lean (referred below to as "lean misfire") based on individual cylinder air fuel ratios, carrying out a decreasing correction of a fuel injection quantity and/or an increasing correction of an intake air quantity for that cylinder, of which rich misfire is detected, to prevent rich misfire, and carrying out an increasing correction of a fuel injection quantity and/or a decreasing correction of an intake air quantity for that cylinder, in which lean misfire is detected, to prevent lean misfire.

Further, the ECU 40 executes the misfire restoration control by discriminatingly detecting misfire caused by excessive spark-advance (referred below to as "spark-advance misfire") and misfire caused by excessive spark-retard (referred below to as "spark-retard misfire") based on ignition timing for that cylinder, of which misfire is detected, carrying out the spark-retard correction of ignition timing for that cylinder, of which spark-advance misfire is detected, to prevent spark-advance misfire, and carrying out the spark-advance correction of ignition timing for that cylinder, of which spark-retard misfire is detected, to prevent spark-retard misfire.

Further, in the case where detection of misfire continues even when the misfire restoration control described above is executed for a predetermined period of time, it is judged that it is not possible to return to normal combustion, and injection cut or both injection cut and ignition cut are carried out for that cylinder, of which misfire is detected, to stop the operation of the misfire cylinder.

Subsequently, an explanation will be given to a concrete example of a model (referred below to as "individual cylinder air fuel ratio estimation model") to estimate individual cylinder air fuel ratios based on a detection value of the air fuel ratio sensor 37.

Paying attention to gas exchange in the exhaust-collector 36, a detection value of an air fuel ratio sensor 37 is modeled by multiplying the hysteresis of air fuel ratios by cylinder in the exhaust-collector 36 and the hysteresis of a detection value of the air fuel ratio sensor 37 by respective predetermined weights to add the same, and the model is made use of to estimate air fuel ratios by cylinder. In addition, a Karman filter is used for an observer.

More concretely, the model of gas exchange in the exhaust-collector 36 is approximated with the following formula (1).

$$ys(t)=k1 \times u(t-1)+k2 \times u(t-2)-k3 \times ys(t-1)-k4 \times ys(t-2) \quad (1)$$

where ys indicates a detection value of the air fuel ratio sensor 37, u indicates an air fuel ratio of gases flowing into the exhaust-collector 36, and k1 to k4 indicate constants.

Present in an exhaust system are a primary retard element of gas flow and mixing in the exhaust-collector 36, and a primary retard element caused by response retard of the air fuel ratio sensor 37. Hereupon, the formula (1) takes account of these primary retard elements to refer to hysteresis for two times in the past.

Converting the formula (1) into a state space model, the formulae (2a), (2b) are deduced.

$$X(t+1)=A \cdot X(t)+B \cdot u(t)+W(t) \quad (2a)$$

$$Y(t)=C \cdot X(t)+D \cdot u(t) \quad (2b)$$

where A, B, C, D indicate parameters of the model, Y indicates a detection value of the air fuel ratio sensor 37, X indicates an individual cylinder air fuel ratio as a state variable, and W indicates noise.

Further, designing a Karman filter by the use of the formulae (2a), (2b), the following formula (3) is obtained.

$$X\hat{\,}(k+1|k)=A \cdot X\hat{\,}(k|k-1)+K\{Y(k)-C \cdot A \cdot X\hat{\,}(k|k-1)\} \quad (3)$$

where X^(x hat) indicates an estimated value of an individual cylinder air fuel ratio, and K indicates the Karman gain. X^(k+1|k) means finding an estimated value of time (k+1) based on an estimated value of time (k).

Thus, individual cylinder air fuel ratios can be sequentially estimated with the advance of combustion cycle by constituting the individual cylinder air fuel ratio estimation model by a Karman filter type observer.

Subsequently, an explanation will be given to contents of procedures in the respective routines shown in FIGS. 2 to 7 and executed by the ECU 40 for detection of misfire.

[Misfire Detection Main Routine]

Figure 2:
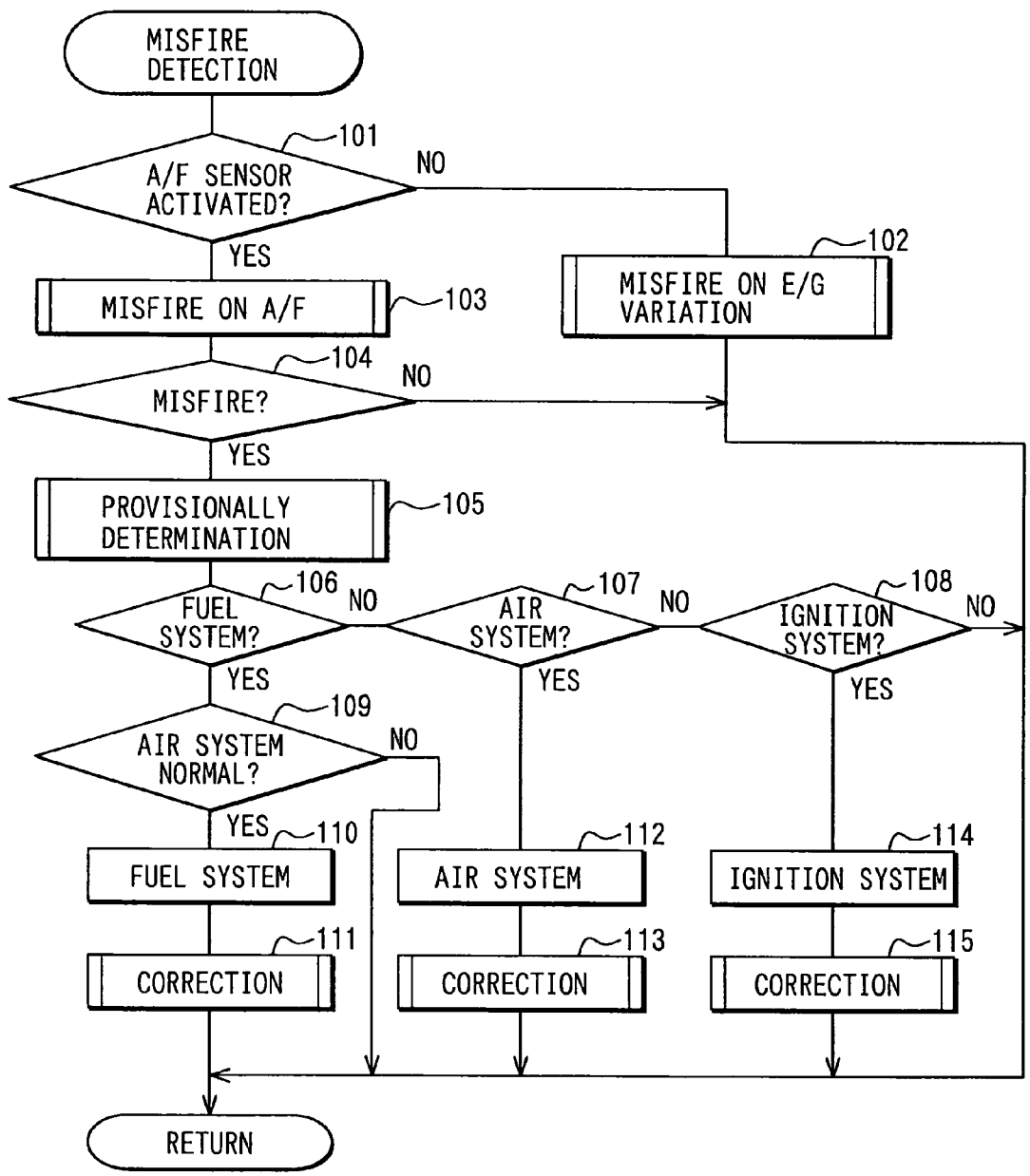
FIG. 2 is a flowchart showing the flow of a processing in a misfire detection main routine.

The misfire detection main routine shown in FIG. 2 is started up every predetermined crank angle (for example, every 30° CA) in the operation of the engine. When the routine is started up, it is first judged in STEP 101 whether the air fuel ratio sensor 37 is put in an activated state. When the air fuel ratio sensor 37 is not put in an activated state, the air fuel ratio sensor 37 is low in accuracy of detection of an air fuel ratio. The procedure proceeds to STEP 102 to execute a misfire detection routine (not shown) based on variation in engine rotation to detect an amount of variation in engine rotation to make a comparison between the amount of variation in engine rotation and a predetermined misfire determination value, thereby determining presence and absence of misfire.

Figure 3:
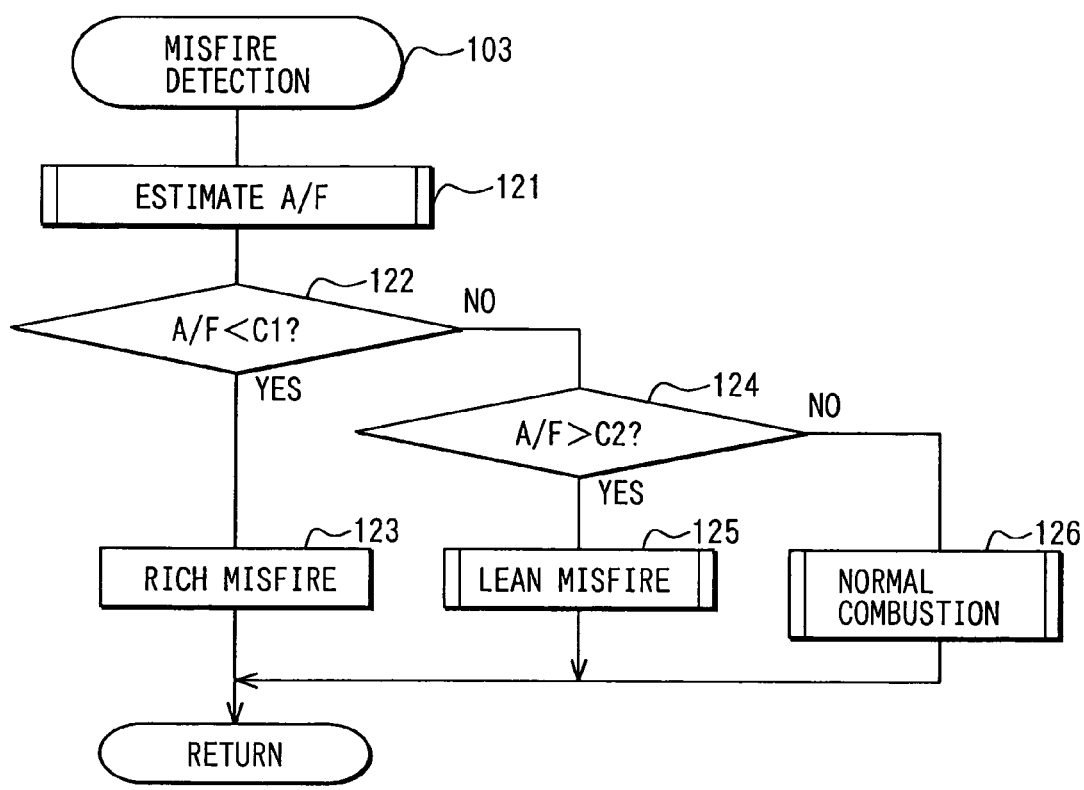
FIG. 3 is a flowchart showing the flow of a processing in a misfire detection routine based on an individual cylinder air fuel ratio.

On the other hand, when the air fuel ratio sensor 37 is put in an activated state, the procedure proceeds to STEP 103 in FIG. 3 to execute a misfire detection routine based on a individual cylinder air fuel. In this routine, a comparison is conducted between a individual cylinder air fuel ratio estimated based on a detection value of the air fuel ratio sensor 37 with the use of the individual cylinder air fuel ratio estimation model, and the determination values C1, C2, thereby determining presence and absence of misfire by cylinder.

Thereafter, the procedure proceeds to STEP 104 to determine whether presence of misfire is determined in the misfire detection routine shown in FIG. 3, and when presence of misfire is not determined, the routine is terminated as it is. When presence of misfire is determined, the procedure proceeds to STEP 105 to execute a misfire cause provisional determination routine of FIG. 4 described later to provisionally determine a misfire cause (abnormal part).

Figure 4:
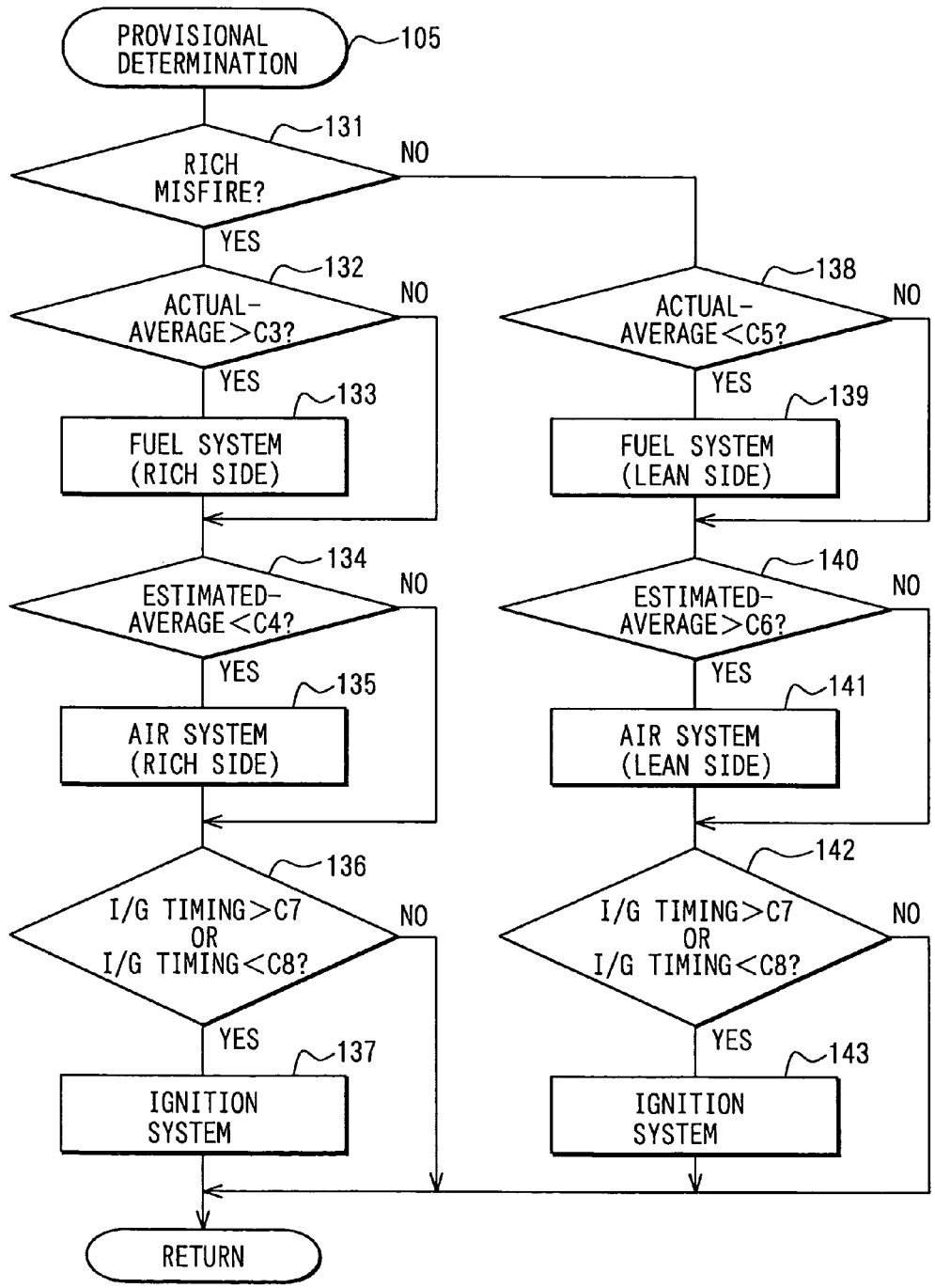
FIG. 4 is a flowchart showing the flow of a processing in a misfire cause provisional determination routine.

Thereafter, the procedure proceeds to STEP 106 to determine whether the fuel system is provisionally determined to cause misfire, based on results of determination in the misfire cause provisional determination routine of FIG. 4. When the fuel system is provisionally determined to cause misfire, the procedure proceeds to STEP 109 to determine whether the air system is provisionally determined to be normal, based on results of determination in the misfire cause provisional determination routine of FIG. 4. When the air system is not provisionally determined to be normal, the routine is terminated as it is, and when the air system is provisionally determined to be normal, the procedure proceeds to STEP 110 to conclude determination of abnormality in the fuel system. Thereafter, the procedure proceeds to STEP 111 to execute a fuel system correction routine of FIG. 5 described later to calculate a corrected fuel injection quantity of a misfire cylinder to correct a fuel injection quantity of the misfire cylinder, thus executing the misfire restoration control, in which an air fuel ratio of the misfire cylinder is corrected to a normal combustion range.

On the other hand, when it is determined in STEP 106 that the fuel system is not provisionally determined to cause misfire, the procedure proceeds to STEP 107 to determine whether the air system is provisionally determined to cause misfire, based on results of determination in the misfire cause provisional determination routine of FIG. 4. When the air system is provisionally determined to cause misfire, the procedure proceeds to STEP 112 to conclude determination of abnormality in the air system. Thereafter, the procedure proceeds to STEP 113 to execute an air system correction routine of FIG. 6 described later to calculate a corrected air quantity of a misfire cylinder to correct an air quantity of the misfire cylinder, thus executing the misfire restoration control, in which an air fuel ratio of the misfire cylinder is corrected to a normal combustion range.

Also, when it is determined in STEP 107 that the air system is not provisionally determined to cause misfire, the procedure proceeds to STEP 108 to determine whether the ignition system is provisionally determined to cause misfire, based on results of determination in the misfire cause provisional determination routine of FIG. 4. When the ignition system is provisionally determined to cause misfire, the procedure proceeds to STEP 114 to conclude determination of abnormality in the ignition system. Thereafter, the procedure proceeds to STEP 115 to execute an ignition system correction routine of FIG. 7 described later to calculate a corrected ignition timing of a misfire cylinder to correct ignition timing of the misfire cylinder, thus executing the misfire restoration control, in which ignition timing of the misfire cylinder is corrected to a normal combustion range.

[Misfire Detection Routine Based on Individual Cylinder Air Fuel Ratio]

A misfire detection routine based on a individual cylinder air fuel ratio, shown in FIG. 3 is a subroutine started up in STEP 103 of FIG. 2 after the air fuel ratio sensor 37 is activated, and serving as misfire detection means described in the claims. When the routine is started up, a individual cylinder air fuel ratio estimation routine (not shown) is first executed in STEP 121, in which the individual cylinder air fuel ratio estimation model is used to estimate a individual cylinder air fuel ratio based on a detection value (an actual air fuel ratio of exhaust gases flowing through the exhaust-collector 36) of the air fuel ratio sensor 37. The processing in STEP 121 serves as individual cylinder air fuel ratio information acquisition means described in the claims.

Thereafter, the procedure proceeds to STEP 122 to make a comparison between the estimated individual cylinder air fuel ratio and the rich-side determination value C1 to determine whether misfire is caused by excessive rich (rich misfire). When the individual cylinder air fuel ratio is less than the rich-side determination value C1, the procedure proceeds to STEP 123 to determine rich misfire.

In contrast, when the individual cylinder air fuel ratio is the rich-side determination value C1 or more, the procedure proceeds to STEP 124 to make a comparison between the estimated individual cylinder air fuel ratio and the lean-side determination value C2 to determine whether misfire is caused by excessive lean (lean misfire). When the individual cylinder air fuel ratio is greater than the lean-side determination value C2, the procedure proceeds to STEP 125 to determine lean misfire. When the individual cylinder air fuel ratio is the lean-side determination value C2 or less, the procedure proceeds to STEP 126 to determine normal combustion.

Figure 8:
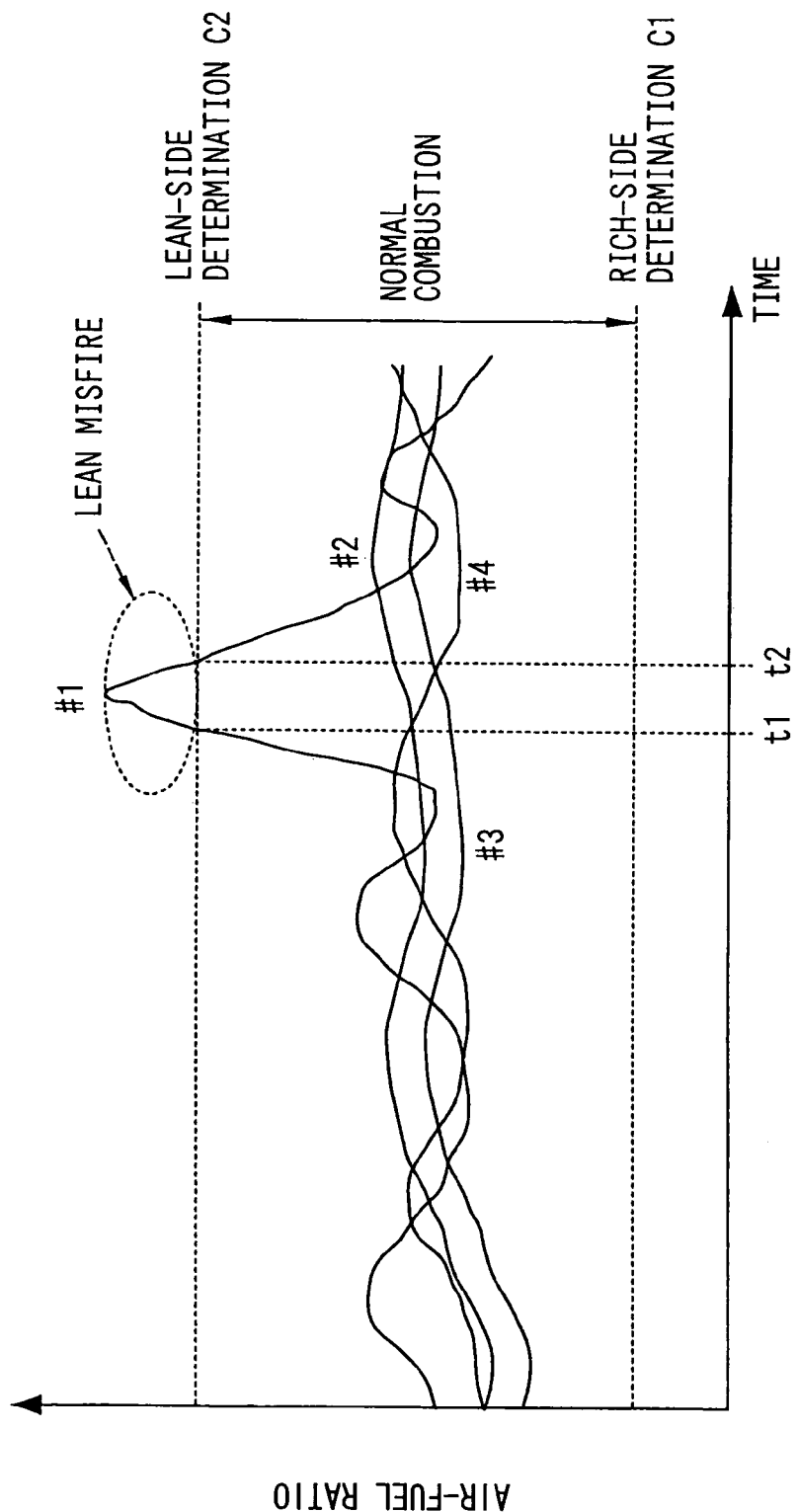
FIG. 8 is a time chart showing an example of a behavior of individual cylinder air fuel ratios of a cylinder, in which lean misfire is caused, and other cylinders.

In short, normal combustion and misfire are determined depending upon whether the estimated individual cylinder air fuel ratio is within a normal combustion range (a range from the rich-side determination value C1 to the lean-side determination value C2) shown in FIG. 8. Further in case of misfire, rich misfire and lean misfire are discriminatingly detected by determining whether a individual cylinder air fuel ratio is less than the rich-side determination value C1 and greater than the lean-side determination value C2.

In an example shown in FIG. 8, since individual cylinder air fuel ratios of a second cylinder #2, a third cylinder #3, and a fourth cylinder #4, respectively, are maintained within the normal combustion range (a range of C1 to C2), determination of normal combustion continues but a individual cylinder air fuel ratio of a first cylinder #1 is put in a state beyond the lean-side determination value C2 between time t1 and time t2, so that the first cylinder #1 is determined to cause lean misfire.

In addition, when all the cylinders are determined to cause misfire, it suffices that a main feedback correction learned value in air fuel ratio control be used to determine which of the fuel system, the air system, and the ignition system is abnormal.

[Misfire Cause Provisional Determination Routine]

The misfire cause provisional determination routine of FIG. 4 is a subroutine started up in the subsequent STEP 105 when presence of misfire (rich misfire or lean misfire) is determined in STEP 104 of FIG. 2, and serving as misfire cause determination means described in the claims. When the routine is started up, it is first judged in STEP 131 whether rich misfire is caused, and in case of rich misfire, determination is carried out in STEP 132, STEP 134, and STEP 136 to determine which of the fuel system, the air system, and the ignition system causes rich misfire.

Concretely, it is first judged in STEP 132 whether a difference between an actual injection quantity of that cylinder, in which rich misfire is detected, and an average value of actual injection quantities of all the cylinders is greater than a determination value C3 (whether an actual injection quantity of that cylinder, in which rich misfire is detected, is greater by at least C3 than an average value of actual injection quantities of all the cylinders) or not. In case of results of determination being "Yes", the procedure proceeds to STEP 133 to provisionally determine that the fuel system causes rich misfire. In addition, it suffices to calculate actual injection quantities of the respective cylinders based on injection duration (injection pulse width) for the fuel injection valves 20 of the respective cylinders. Alternatively, taking account of presence of a wet fuel adhering to inner wall surfaces of an intake port or the like, cylinder inflowing fuel quantities actually sucked by the cylinders may be estimated by means of a fuel transport model and the estimated cylinder inflowing fuel quantities of the respective cylinders may be used instead of actual injection quantities of the respective cylinders.

Thereafter, the procedure proceeds to STEP 134 to determine whether a difference between an estimated air quantity of that cylinder, in which rich misfire is detected, and an average value of actual air quantities of all the cylinders is smaller than a determination value C4 or not (whether an actual air quantity of that cylinder, in which rich misfire is detected, is smaller by at least C4 than an average value of actual air quantities of all the cylinders). In case of results of determination being "Yes", the procedure proceeds to STEP 135 to provisionally determine that the air system causes rich misfire.

In this case, it suffices that the following formula be used to calculate the estimated air quantity of the misfire cylinder with the use of an estimated value of an individual cylinder air fuel ratio and an actual injection quantity by cylinder.

Estimated air quantity of misfire cylinder=estimated value of individual cylinder air fuel ratio×actual injection quantity by cylinder×coefficient In the formula, the coefficient is one taking account of ease every cylinder in sucking an air and a fuel. While the formula uses the coefficient to correct the presence of a wet fuel adhering to inner wall surfaces of an intake port or the like, cylinder inflowing fuel quantities actually sucked by the cylinders may be estimated by the use of the fuel transport model taking account of the presence of a wet fuel and the cylinder inflowing fuel quantities may be used instead of an actual injection quantity by cylinder to calculate an estimated air quantity of a cylinder by means of the following formula.

Estimated air quantity of misfire cylinder=estimated value of individual cylinder air fuel ratio×cylinder inflowing fuel quantity×coefficient Alternatively, making use of an intake system model to simulate an air flow in an intake system, estimated air quantities of the respective cylinders may be calculated based on detection values of the air flow meter 14 and/or the intake-pipe pressure sensor 18.

In addition, it suffices to calculate an average value of actual air quantities of all the cylinders based on detection values of the air flow meter 14 and/or the intake-pipe pressure sensor 18.

Thereafter, the procedure proceeds to STEP 136 to determine whether ignition timing of that cylinder, in which rich misfire is detected, is greater (spark-advance) than a spark-advance side determination value C7, or less (spark-retard) than a spark-retard side determination value C8. In case of results of determination being "Yes", the procedure proceeds to STEP 137 to provisionally determine that the ignition system causes rich misfire.

On the other hand, in case of results of determination in STEP 131 being "No", that is, in case of lean misfire, determination in STEP 138, STEP 140, and STEP 142 is made to discriminate which of the fuel system, the air system, and the ignition system causes lean misfire.

Concretely, it is first judged in STEP 138 whether a difference between an actual injection quantity of that cylinder, in which lean misfire is detected, and an average value of actual injection quantities of all the cylinders is less than a determination value C5 (whether an actual injection quantity of that cylinder, in which lean misfire is detected, is less, by at least C5 or more, than an average value of actual injection quantities of all the cylinders). The determination value C5 used in STEP 138 assumes a negative value (the determination value C5 used in STEP 132 assumes a positive value). In case of results of determination in STEP 138 being "Yes", the procedure proceeds to STEP 139 to provisionally determine that the fuel system causes lean misfire.

Thereafter, the procedure proceeds to STEP 140 to determine whether a difference between an estimated air quantity of that cylinder, in which lean misfire is detected, and an average value of actual air quantities of all the cylinders is greater than a determination value C6 or more (whether an actual air quantity of that cylinder, in which lean misfire is detected, is greater by at least C6 than an average value of actual air quantities of all the cylinders). The determination value C6 used in STEP 140 assumes a positive value (the determination value C4 used in STEP 134 assumes a negative value). In case of results of determination in STEP 140 being "Yes", the procedure proceeds to STEP 141 to provisionally determine that the air system causes lean misfire.

Thereafter, the procedure proceeds to STEP 142 to determine whether ignition timing of that cylinder, in which lean misfire is detected, is greater (spark-advance) than the spark-advance side determination value C7, or less (spark-retard) than a spark-retard side determination value C8. In case of results of determination being "Yes", the procedure proceeds to STEP 143 to provisionally determine that the ignition system causes lean misfire.

Figure 9:
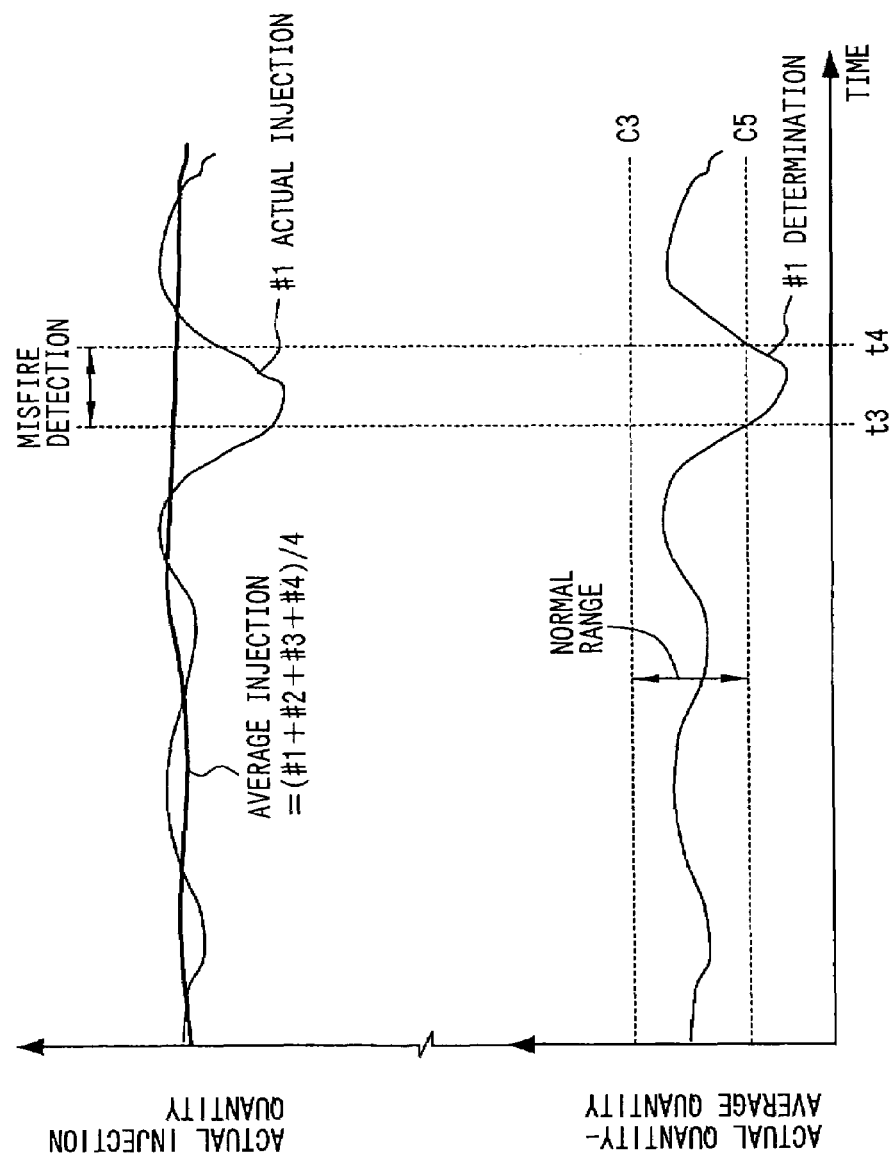
FIG. 9 shows time charts showing examples of a behavior of an actual injection quantity of a cylinder, in which lean misfire is caused by a fuel system, and a behavior of a difference between an actual injection quantity of the misfire cylinder and an average value of actual injection quantities of all the cylinders.

A method of determining the cause for misfire by means of the routine described above will be described with reference to FIGS. 9 and 10. FIG. 9 shows a behavior when the fuel system is responsible for generation of lean misfire in the first cylinder #1. When an actual injection quantity for the first cylinder #1 decreases remarkably due to some reason, an air fuel ratio of the first cylinder #1 shifts to an excessive lean side and lean misfire is generated in the first cylinder #1. At this time, as an actual injection quantity for the first cylinder#1 decreases, a difference between the actual injection quantity for the first cylinder #1 and an average value of actual injection quantities of all the cylinders changes in a negative direction, so that a difference between the actual injection quantity for the first cylinder #1 and the average value of actual injection quantities of all the cylinders becomes equal to or less than the determination value C5 (negative value) at time t3 and it is determined that the fuel system is responsible for generation of lean misfire in the first cylinder #1. Thereafter, the difference between the actual injection quantity for the first cylinder #1 and the average value of actual injection quantities of all the cylinders returns to at least the determination value C5 and it is determined that the fuel system is normal.

Figure 10:
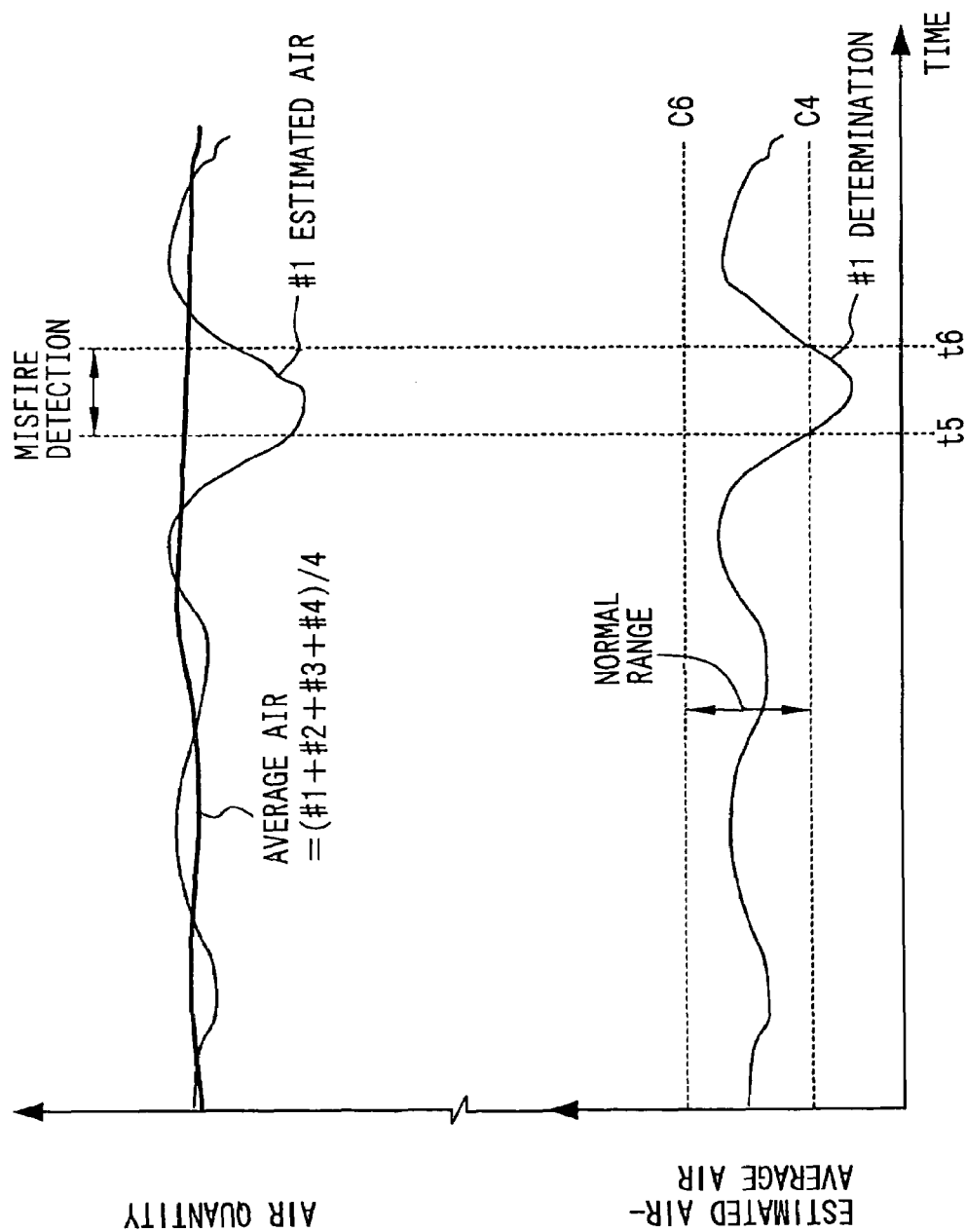
FIG. 10 shows time charts showing examples of a behavior of an estimated air quantity of a cylinder, in which rich misfire is caused by an air system, and a behavior of a difference between an estimated air quantity of the misfire cylinder and an average value of actual air quantities of all the cylinders.

On the other hand, FIG. 10 shows a behavior when the air system is responsible for generation of rich misfire in the first cylinder #1. When an actual air quantity (estimated air quantity) for the first cylinder #1 decreases remarkably due to some reason, an air fuel ratio of the first cylinder #1 shifts to an excessive rich side and rich misfire is generated in the first cylinder #1. At this time, as an estimated air quantity for the first cylinder #1 decreases, a difference between the estimated air quantity for the first cylinder #1 and an average value of actual air quantities of all the cylinders changes in a negative direction, so that a difference between the estimated air quantity for the first cylinder #1 and the average value of actual air quantities of all the cylinders becomes equal to or less than the determination value C4 (negative value) at time t5 and it is determined that the air system is responsible for generation of rich misfire in the first cylinder #1. Thereafter, the difference between the estimated air quantity for the first cylinder #1 and the average value of actual air quantities of all the cylinders returns to at least the determination value C4 at time t6 and it is determined that the air system is normal.

[Fuel System Correction Routine]

Figure 5:
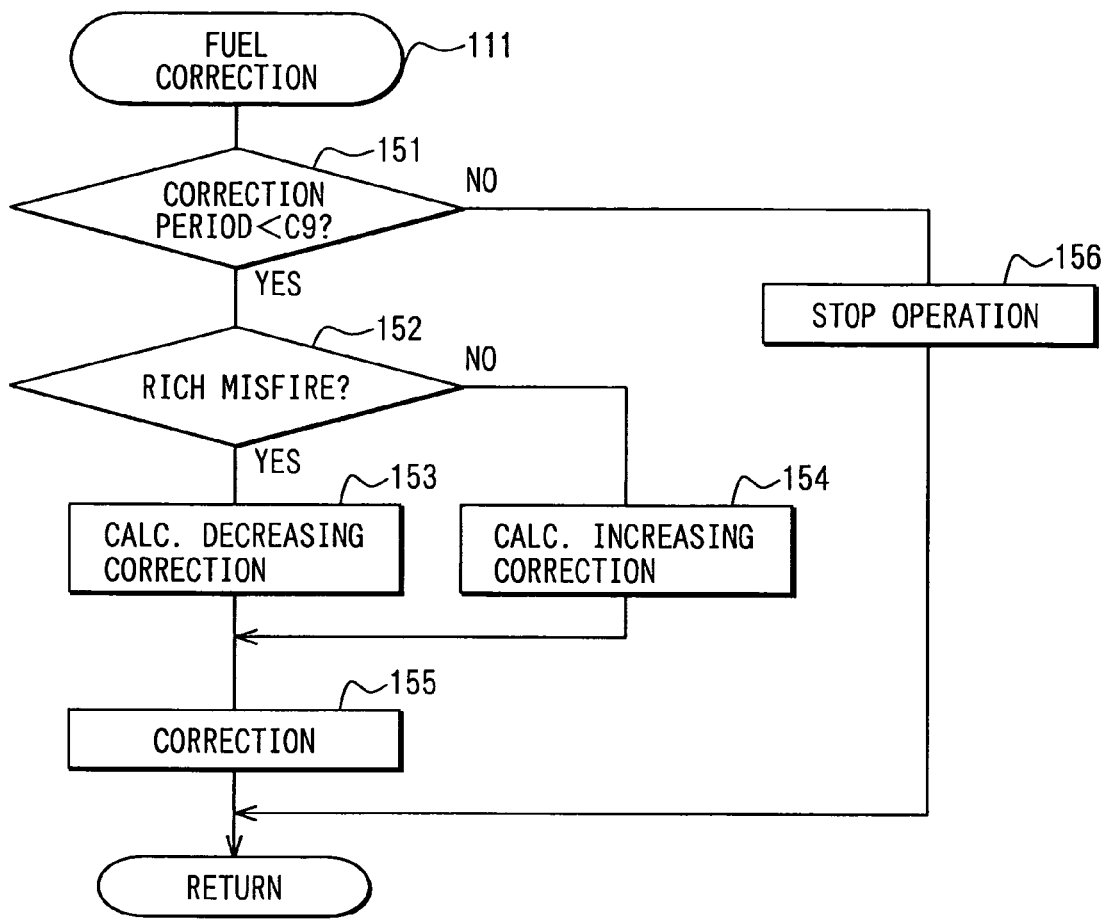
FIG. 5 is a flowchart showing the flow of a processing in a fuel system correction routine.

The fuel system correction routine of FIG. 5 is a subroutine started up in the subsequent STEP 111 when it is determined in STEP 110 of FIG. 2 that the fuel system causes misfire, and serving as misfire restoration control means described in the claims. When the routine is started up, it is first determined in STEP 151 whether a period of time, during which correction of an injection quantity for restoration of misfire in the procedures of STEP 152 to STEP 155 of the routine is executed, is less than a predetermined time C9. When the period of time for execution of correction of an injection quantity is less than the predetermined time C9, the procedure proceeds to STEP 152 to determine whether rich misfire is caused.

When rich misfire is determined in STEP 152, the procedure proceeds to STEP 153 to calculate the decreasing correction of an injection quantity based on an estimated air fuel ratio (an estimated value of an individual cylinder air fuel ratio) of that cylinder, in which rich misfire is detected. In addition, the decreasing correction of an injection quantity may be calculated based on a difference between an actual injection quantity of that cylinder, in which rich misfire is detected, and an average value of actual injection quantities of all the cylinders.

On the other hand, when lean misfire is determined in STEP 152, the procedure proceeds to STEP 154 to calculate the increasing correction of an injection quantity based on an estimated air fuel ratio of that cylinder, in which lean misfire is detected. In addition, the increasing correction of an injection quantity may be calculated based on a difference between an actual injection quantity of that cylinder, in which lean misfire is detected, and an average value of actual injection quantities of all the cylinders.

After the decreasing/increasing correction of an injection quantity of the misfire cylinder is thus calculated in STEP 153 or STEP 154, the procedure proceeds to STEP 155 to correct an injection quantity of the misfire cylinder with the correction quantity to revise an air fuel ratio of the misfire cylinder to the normal combustion range so that the misfire cylinder be returned early to normal combustion.

When the period of time for execution of correction of an injection quantity is less than the predetermined time C9, correction of an injection quantity in the procedures of STEP 152 to STEP 155 is executed until determination of abnormality in the fuel system is cancelled. In the case where the period of time for execution of correction of an injection quantity reaches the predetermined time C9 while determination of abnormality in the fuel system is not cancelled, however, "No" is determined in STEP 151. The procedure proceeds to STEP 156 to determine that it is not possible to return to normal combustion, and to carry out injection cut or both injection cut and ignition cut for the misfire cylinder to stop the operation of the misfire cylinder. In this case, the procedures of STEP 151→STEP 156 serve as individual cylinder operation stop means described in the claims.

[Air System Correction Routine]

Figure 6:
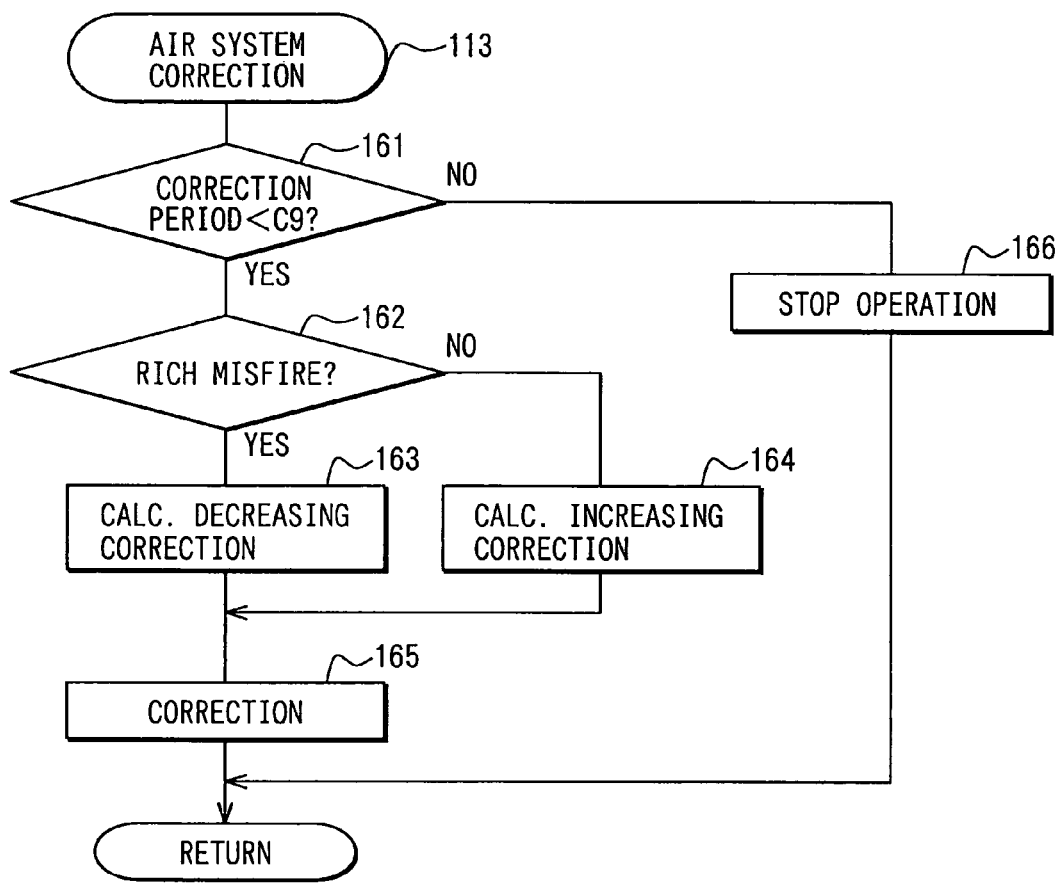
FIG. 6 is a flowchart showing the flow of a processing in an air system correction routine.

The air system correction routine of FIG. 6 is a subroutine started up in the subsequent STEP 113 when it is determined in STEP 112 of FIG. 2 that the air system causes misfire, and serving as misfire restoration control means described in the claims. When the routine is started up, it is first determined in STEP 161 whether a period of time, during which correction of an air quantity for restoration of misfire in the procedures of STEP 162 to STEP 165 of the routine is executed, is less than the predetermined time C9. When the period of time for execution of correction of an air quantity is less than the predetermined time C9, the procedure proceeds to STEP 162 to determine whether rich misfire is caused.

When rich misfire is determined in STEP 162, the procedure proceeds to STEP 163 to calculate the decreasing correction of an air quantity based on an estimated air fuel ratio of that cylinder, of which rich misfire is detected. In addition, the decreasing correction of an air quantity may be calculated based on a difference between an estimated air quantity of that cylinder, of which rich misfire is detected, and an average value of actual air quantities of all the cylinders.

On the other hand, when lean misfire is determined in STEP 162, the procedure proceeds to STEP 164 to calculate the increasing correction of an air quantity based on an estimated air fuel ratio of that cylinder, in which lean misfire is detected. In addition, the increasing correction of an air quantity is calculated based on a difference between an estimated air quantity of that cylinder, in which lean misfire is detected, and an average value of actual air quantities of all the cylinders.

After the decreasing/increasing correction of an air quantity of the misfire cylinder is thus calculated in STEP 163 or STEP 164, the procedure proceeds to STEP 165 to correct an air quantity (throttle opening degree, intake valve lift, etc.) of the misfire cylinder with the correction quantity to decrease a difference between an actual air quantity of the misfire cylinder and an average value of actual air quantities of all the cylinders. Thereby, an air fuel ratio of the misfire cylinder is revised to the normal combustion range, so that the misfire cylinder can be returned early to normal combustion.

When the period of time for execution of correction of an air quantity is less than the predetermined time C9, correction of an air quantity in the procedures of STEP 162 to STEP 165 is executed until determination of abnormality in the air system is cancelled. In the case where the period of time for execution of correction of an air quantity reaches the predetermined time C9 while determination of abnormality in the air system is not cancelled, however, "No" is determined in STEP 161. The procedure proceeds to STEP 166 to judge that it is not possible to return to normal combustion, and to carry our injection cut or both injection cut and ignition cut for the misfire cylinder to stop the operation of the misfire cylinder. In this case, the procedures of STEP 161 STEP 166 serve as individual cylinder operation stop means described in the claims.

[Ignition System Correction Routine]

Figure 7:
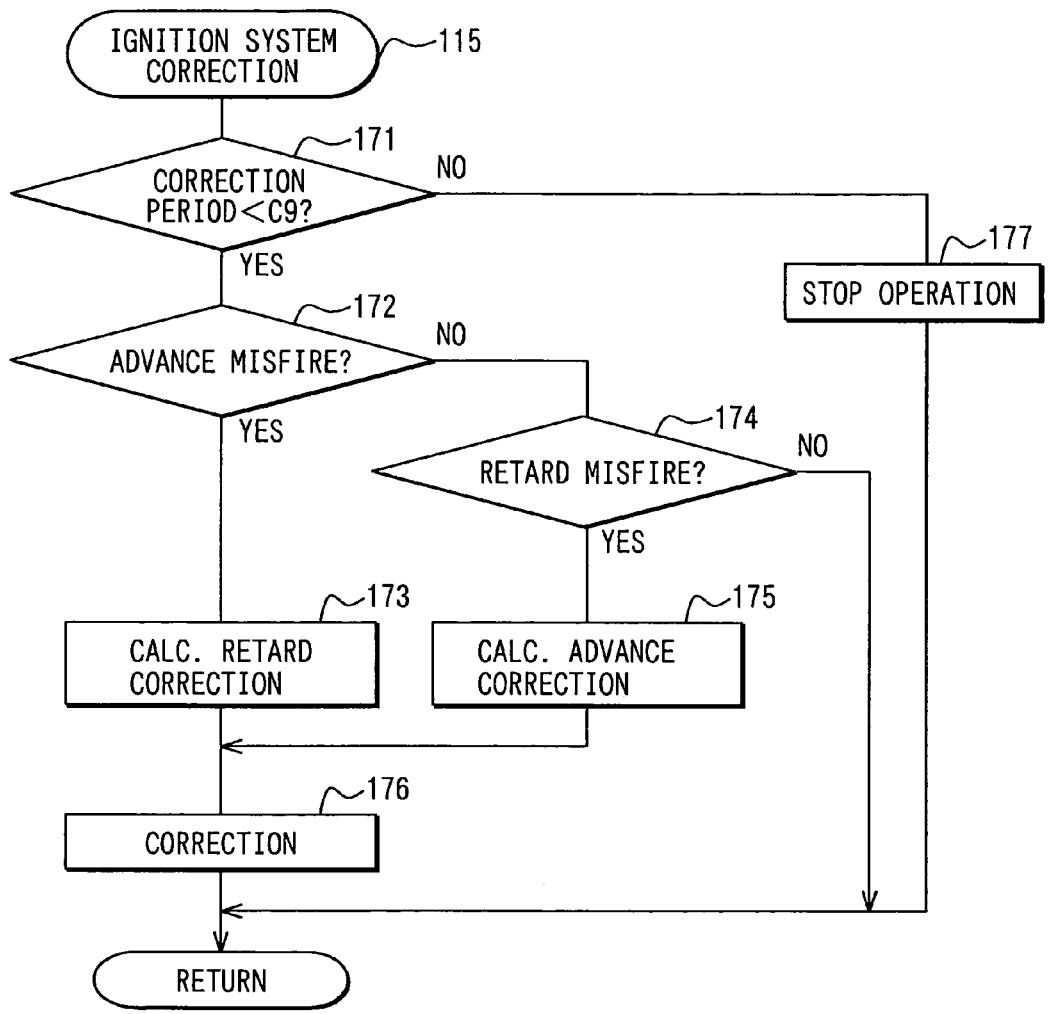
FIG. 7 is a flowchart showing the flow of a processing in an ignition system correction routine.

The ignition system correction routine of FIG. 7 is a subroutine started up in the subsequent STEP 115 when it is determined in STEP 112 of FIG. 2 that the ignition system causes misfire, and serving as misfire restoration control means described in the claims. When the routine is started up, it is first determined in STEP 171 whether a period of time, during which correction of ignition timing for restoration of misfire in the procedures of STEP 172 to STEP 176 of the routine is executed, is less than the predetermined time C9. When the period of time for execution of correction of ignition timing is less than the predetermined time C9, the procedure proceeds to STEP 172 to determine whether spark-advance misfire is caused by an excessive spark advance of ignition timing. This determination is made depending upon whether ignition timing is in spark-advance of the spark-advance side determination value C7.

When spark-advance misfire is determined in STEP 172, the procedure proceeds to STEP 173 to calculate the spark-retard correction quantity of ignition timing of that cylinder, in which spark-advance misfire is detected, based on, for example, a difference between the present ignition timing and the spark-advance side determination value C7. On the other hand, when spark-advance misfire is not determined in STEP 172, the procedure proceeds to STEP 174 to determine whether spark-retard misfire is caused by excessive spark retard of ignition timing. This determination is made depending upon whether ignition timing lags the spark-retard side determination value C8.

When spark-retard misfire is determined in STEP 174, the procedure proceeds to STEP 175 to calculate the spark-advance correction quantity of ignition timing of that cylinder, of which spark-retard misfire is detected, based on, for example, a difference between the present ignition timing and the spark-retard side determination value C8. In addition, in case of results of determination in both STEP 173 and STEP 175 being "No", that is, in case of not coming under either of spark-advance misfire or spark-retard misfire, the routine is terminated as it is.

After the spark-retard/spark-advance correction quantity of ignition timing of the misfire cylinder is thus calculated in STEP 173 or STEP 175. The procedure proceeds to STEP 176 to correct ignition timing of the misfire cylinder with the correction quantity to revise ignition timing of the misfire cylinder to the normal combustion range, thus enabling returning the misfire cylinder to normal combustion.

When the period of time for execution of correction of ignition timing is less than the predetermined time C9, correction of ignition timing in the procedures of STEP 172 to STEP 176 is executed until determination of abnormality in the ignition system is cancelled. In the case where the period of time for execution of correction of ignition timing reaches the predetermined time C9 while determination of abnormality in the ignition system is not cancelled, however, "No" is determined in STEP 171. The procedure proceeds to STEP 177 to determine that it is not possible to return to normal combustion, and to carry out injection cut or both injection cut and ignition cut for the misfire cylinder to stop the operation of the misfire cylinder. In this case, the procedures of STEP 171→STEP 177 serve as individual cylinder operation stop means described in the claims.

Figure 11:
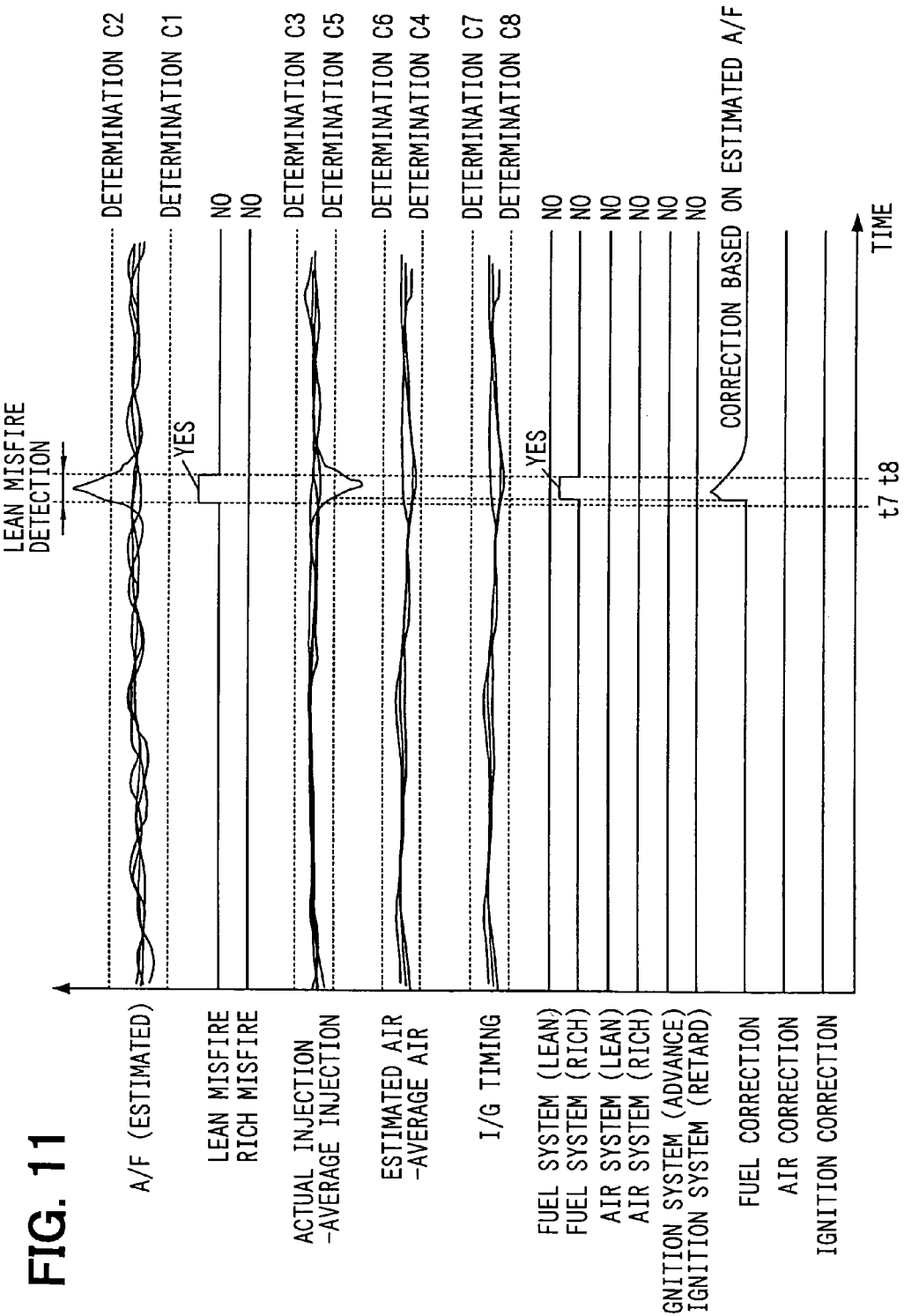
FIG. 11 is a time chart showing an example of control in the case where lean misfire is caused by the fuel system.

An example of control in the embodiment, described above, will be described with a time chart shown in FIG. 11. When the engine is operated, the individual cylinder air fuel ratio estimation model is used to estimate individual cylinder air fuel ratios of the respective cylinders based on a detection value (an actual air fuel ratio of exhaust gases flowing through the exhaust-collector 36) of the air fuel ratio sensor 37 to judge normal combustion and misfire depending upon whether the individual cylinder air fuel ratios of the respective cylinders are within the normal combustion range (the range from the rich-side determination value C1 to the lean-side determination value C2). In the example of FIG. 11, since individual cylinder air fuel ratios of all the cylinders are within the normal combustion range (a range of C1 to C2) before time t7 and from time t8 on, all the cylinders are determined to perform normal combustion.

On the other hand, since an individual cylinder air fuel ratio of one cylinder exceeds the lean-side determination value C2 during a period of time t7–time t8, lean misfire is determined. During the lean misfire detection interval (t7–t8), it is determined whether a difference between an actual injection quantity of that cylinder, in which lean misfire is detected, and an average value of actual injection quantities of all the cylinders is less than the determination value C5, and when the difference is less than the determination value C5, it is provisionally determined that the fuel system causes lean misfire.

In addition, during the lean misfire detection interval (t7–t8), it is determined whether the air system causes lean misfire, depending upon whether a difference between an estimated air quantity of that cylinder, in which lean misfire is detected, and an average value of actual air quantities of all the cylinders is greater than the determination value C6. Further, during the misfire detection interval (t7–t8), it is determined whether the ignition system causes misfire, depending upon whether ignition timing of that cylinder, of which misfire is detected, is in spark-advance of the spark-advance side determination value C7, or lags the spark-retard side determination value C8.

In the example of FIG. 11, since a difference between an actual injection quantity of that cylinder, in which lean misfire is detected, and an average value of actual injection quantities of all the cylinders is less than the determination value C5, it is provisionally determined that the fuel system causes lean misfire. Thereby, an increasing correction of an injection quantity being a correction quantity for the fuel system is calculated based on an estimated air fuel ratio of that cylinder, in which lean misfire is detected. In addition, an injection quantity for the misfire cylinder is increased by the increasing correction quantity to revise an air fuel ratio of the misfire cylinder to the normal combustion range, thus returning the misfire cylinder early to normal combustion.

According to the embodiment described above, paying attention to that property, in which an air fuel ratio (individual cylinder air fuel ratio) of the misfire cylinder changes rapidly at the time of generation of misfire, the individual cylinder air fuel ratio estimation model is used to estimate individual cylinder air fuel ratios of the respective cylinders based on a detection value of the air fuel ratio sensor 37 to determine normal combustion and misfire depending upon whether the individual cylinder air fuel ratios of the respective cylinders are within the normal combustion range. Thus, it is possible to accurately detect misfire by cylinder without being much affected by dispersion in combustion among the cylinders, variation in rotation due to traveling on rough road, and a region of rotation.

Besides, according to the embodiment, for that cylinder, of which misfire is detected, it is determined whether the ignition system causes misfire, based on a difference between an actual injection quantity of the misfire cylinder and an average value of actual injection quantities of all the cylinders. Thus, it is possible to accurately determine whether the fuel system causes misfire. In addition, it may be determined whether the ignition system causes misfire, based on a difference between a target injection quantity of the misfire cylinder and an average value of target injection quantities of all the cylinders, and in short, it suffices to determine whether the ignition system causes misfire, using information with respect to a fuel injection quantity of the misfire cylinder.

Also, according to the embodiment, for that cylinder, of which misfire is detected, it is determined whether the air system causes misfire, based on a difference between an estimated air quantity of the misfire cylinder and an average value of actual air quantities of all the cylinders, so that it is possible to accurately determine whether the air system causes misfire. In this case, it is possible to accurately estimate an estimated air quantity of the misfire cylinder making use of an individual cylinder air fuel ratio estimated with the use of the individual cylinder air fuel ratio estimation model and an actual injection quantity by cylinder. In addition, it may be determined whether the air system causes misfire, based on a difference between an estimated air quantity for the misfire cylinder and an average value of target air quantities of all the cylinders, and in short, it suffices to determine whether the air system causes misfire, using information with respect to an air quantity of the misfire cylinder.

Also, according to the embodiment, for that cylinder, of which misfire is detected, ignition timing of the misfire cylinder is compared with the spark-advance side determination value C7 and the spark-retard side determination value C8 to determine whether the ignition system causes misfire, so that it is possible to accurately determine whether the ignition system causes misfire.

Further, according to the embodiment, since the individual cylinder air fuel ratio estimation model is an autoregressive model to predict a detection value of the air fuel ratio sensor 37 from past detection values thereof, it is possible to accurately estimate a individual cylinder air fuel ratio from a detection value of the air fuel ratio sensor 37. Besides, since the model can be made simple, there is an advantage that it is possible to cancel complexity in modeling and to reduce an operational load on the ECU 40.

Besides, according to the embodiment, since misfire caused by excessive rich (rich misfire) and misfire caused by excessive lean (lean misfire) are discriminatingly detected based on a individual cylinder air fuel ratio estimated by the use of the individual cylinder air fuel ratio estimation model, an air fuel ratio of the misfire cylinder can be revised to the normal combustion range by carrying out a decreasing correction of a fuel injection quantity and/or an increasing correction of an intake air quantity for that cylinder, of which rich misfire is detected, and carrying out an increasing correction of a fuel injection quantity and/or a decreasing correction of an intake air quantity for that cylinder, in which lean misfire is detected, so that in the case where the fuel system and the air system are normal, it is possible to return that cylinder, of which rich misfire or lean misfire is detected, early to normal combustion.

Further, according to the embodiment, for that cylinder, of which misfire is detected, misfire caused by excessive spark-advance (spark-advance misfire) and misfire caused by excessive spark-retard (spark-retard misfire) are discriminatingly detected based on ignition timing to enable carrying out the spark-retard correction of ignition timing for that cylinder, of which spark-advance misfire is detected, and carrying out the spark-advance correction of ignition timing for that cylinder, of which spark-retard misfire is detected. Thus, in the case where the ignition is normal, it is possible to return that cylinder, of which spark-advance misfire or spark-retard misfire is detected, early to normal combustion.

In addition, according to the embodiment, in the case where detection of misfire continues even when the misfire restoration control for restoration of normal combustion from misfire is executed for a predetermined period of time, it is judged that it is not possible to return to normal combustion, and the operation of the misfire cylinder is stopped. Thus, it is possible to avoid a problem of an increase in HC discharge, which is caused by a long standing state of misfire.

In addition, according to the embodiment, taking account of the situation that accuracy in detection of an air fuel ratio is bad before the air fuel ratio sensor 37 is activated, misfire is detected based on variation in engine rotation until the air fuel ratio sensor 37 is activated after start-up. Thus, it is possible to detect misfire with a certain accuracy even before the air fuel ratio sensor 37 is activated. However, it is understood that detection of misfire may be inhibited before the air fuel ratio sensor 37 is activated.

As described above, while according to the embodiment, misfire by cylinder is detected with the use of a individual cylinder air fuel ratio, which is estimated based on a detection value of the air fuel ratio sensor 37, misfire by cylinder may be detected with the use of a correction quantity of a individual cylinder air fuel ratio as information of a individual cylinder air fuel ratio, taking account of the fact that when a particular cylinder causes misfire, a correction quantity of a individual cylinder air fuel ratio of the misfire cylinder increases rapidly in a system, in which air fuel ratios of a mixture supplied to respective cylinders are corrected by cylinder.

Besides, the invention is not limited to an intake port injection engine but can be variously embodied within a scope not departing from the gist thereof such that it can be embodied in application to an in-cylinder injection engine.

What is claimed is:

1. A misfire detection apparatus for internal combustion engines, comprising:
   an individual cylinder air fuel ratio information acquisition means to acquire air fuel ratios of exhaust gases in individual cylinders of an internal combustion engine, or parameters variable according thereto, as individual cylinder air fuel ratio information,
   a misfire detection means to detect misfire by a cylinder based on the individual cylinder air fuel ratio information acquired by the individual cylinder air fuel ratio information acquisition means, and
   a misfire cause determination means to determine a cause for misfire for that cylinder, in which misfire is detected by the misfire detection means, based on at least one of a fuel injection quantity, an intake air quantity, and ignition timing;
   wherein the individual cylinder air fuel ratio information acquisition means estimates air fuel ratios, as individual cylinder air fuel ratios, of exhaust gases in individual cylinders based on a detection value of an air fuel ratio sensor mounted in an exhaust-collector, through which exhaust gases of the respective cylinders collect to flow;
   a detection value of the air fuel ratio sensor is modeled by adding a weighed history of the air fuel ratio and a weighted history of detection values of the air fuel ratio sensor, and
   the information acquisition means estimates the air fuel ratio with the use of the model.

2. A misfire detection apparatus for internal combustion engines, comprising:
   an individual cylinder air fuel ratio information acquisition means to acquire air fuel ratios of exhaust gases in individual cylinders of an internal combustion engine, or parameters variable according thereto, as individual cylinder air fuel ratio information,
   a misfire detection means to detect misfire by a cylinder based on the individual cylinder air fuel ratio information acquired by the individual cylinder air fuel ratio information acquisition means, and
   a misfire cause determination means to determine a cause for misfire for that cylinder, in which misfire is detected by the misfire detection means, based on at least one of a fuel injection quantity, an intake air quantity, and ignition timing;
   wherein the individual cylinder air fuel ratio information acquisition means estimates air fuel ratios, as individual cylinder air fuel ratios, of exhaust gases in individual cylinders based on a detection value of an air fuel ratio sensor mounted in an exhaust-collector, through which exhaust gases of the respective cylinders collect to flow,
   a detection value of the air fuel ratio sensor is modeled by multiplying a hysteresis of the individual cylinder air fuel ratios and the hysteresis of detection values of the air fuel ratio sensor, and
   the individual cylinder air fuel ratio information acquisition means estimates individual cylinder air fuel ratios with the use of the model.

3. A method of detecting misfire in internal combustion engines, the method comprising:
   acquiring air fuel ratios of exhaust gases in individual cylinders of an internal combustion engine, or parameters variable according thereto, as acquired individual cylinder air fuel ratio information;
   detecting misfire by a cylinder based on the acquired individual cylinder air fuel ratio information;
   determining a cause for misfire for that cylinder, in which misfire is detected, based on a fuel injection quantity, an intake air quantity, and/or ignition timing; and
   at least momentarily storing the cause of the misfire in a memory;
   wherein individual cylinder air fuel ratios of exhaust gases in indivdual cylinders are estimated based on a detection value of an air fuel ratio sensor mounted in an exhaust-collector, through which exhaust gases of the respective cylinders collect to flow;
   a detection value of the air fuel ratio sensor is modeled by multiplying a hysteresis of the individual cylinder air fuel ratios and the hysteresis of detection values of the air fuel ratio sensor, and
   individual cylinder air fuel ratios are estimated with the use of the model.

4. A misfire detection apparatus for an internal combustion engine, comprising:
   an information acquisition means for acquiring air fuel ratio information representing an air fuel ratio of exhaust gas in each cylinder of the internal combustion engine or a parameter variable according to the air fuel ratio for each cylinder;

a misfire detection means for detecting misfire cylinder by cylinder based on the air fuel ratio information acquired by the information acquisition means, and a misfire cause determination means for determining a cause for misfire for the cylinder in which misfire is detected by the misfire detection means, based on at least one of a fuel injection quantity, an intake air quantity, and ignition timing;

wherein the information acquisition means estimates the air fuel ratio of the exhaust gas in each cylinder based on a detection value of an air fuel ratio sensor mounted in a confluent portion of the exhaust gas, through which exhaust gases of the respective cylinders collect to flow;

a detection value of the air fuel ratio sensor is modeled with a model formed by adding a weighted history of detection values of the air fuel ratio sensor, and the information acquisition means estimates the air fuel ratio with the use of the model.

5. A method of detecting misfire in an internal combustion engine, the method comprising:

acquiring air fuel ratio information representing an air fuel ratio of exhaust gas in each cylinder of the internal combustion engine or a parameter variable according to the air fuel ratio for each cylinder;

detecting misfire by a cylinder based on the acquired air fuel ratio information; and determining a cause for misfire for tat cylinder, in which misfire is detected, based on a fuel injection quantity, an intake air quantity, and/or ignition timing; and at least momentarily storing the cause of the misfire in a memory;

wherein the air fuel ratio of exhaust gases in each cylinder is estimated based on a detection value of an air fuel ratio sensor mounted in an exhaust-collector, through which exhaust gases of the respective cylinders collect to flow;

a detection value of the air fuel ratio sensor is modeled with a model formed by adding a weighted history of the individual cylinder air fuel ratios and the hysteresis of detection values of the air fuel ratio sensor, and individual cylinder air fuel ratios are estimated with the use of the model.

6. A misfire detection apparatus for an internal combustion engine, comprising:

an information acquisition means for acquiring air fuel ratio information representing an air fuel ratio of exhaust gas in each cylinder of the internal combustion engine or a parameter variable according to the air fuel ratio for each cylinder;

a misfire detection means for detecting misfire by a cylinder based on the air fuel ratio information acquired by the information acquisition means, and a misfire cause determination means for determining a cause for misfire for the cylinder in which misfire is detected by the misfire detection means, based on at least one of a fuel injection quantity, an intake air quantity, and ignition timing;

wherein the information acquisition means estimates the air fuel ratio of exhaust gases in each cylinder based on a detection value of an air fuel ratio sensor mounted in an exhaust-collector, through which exhaust gases of the respective cylinders collect to flow, a detection value of the air fuel ratio sensor is modeled by a model formed by adding a weighted history of the air fuel ratio and a history of detection values of the air fuel ratio sensor, and the information acquisition means estimates the air fuel ratio with the use of the model.

* * * * *